US011893613B2

(12) United States Patent
Francis et al.

(10) Patent No.: US 11,893,613 B2
(45) Date of Patent: Feb. 6, 2024

(54) SYSTEMS, MANUFACTURE, AND METHODS FOR CONTROLLING ACCESS TO RESOURCES

(71) Applicant: Shopify Inc., Ottawa (CA)

(72) Inventors: Scott Francis, Washington, DC (US); Bassam Mansoob, Kitchener (CA); Logan Francis Fontes Martel, Montreal (CA)

(73) Assignee: Shopify Inc., Ottawa (CA)

( * ) Notice: Subject to any disclaimer, the term of this patent is extended or adjusted under 35 U.S.C. 154(b) by 330 days.

(21) Appl. No.: 17/132,611

(22) Filed: Dec. 23, 2020

(65) Prior Publication Data

US 2022/0198538 A1 Jun. 23, 2022

(51) Int. Cl.
*G06Q 30/00* (2023.01)
*G06Q 30/0601* (2023.01)

(52) U.S. Cl.
CPC ..... *G06Q 30/0605* (2013.01); *G06Q 30/0635* (2013.01); *G06Q 30/0641* (2013.01)

(58) Field of Classification Search
CPC ................ G06Q 30/0601–0645; G06Q 30/08
USPC .................................................. 705/26.1–27.2
See application file for complete search history.

(56) References Cited

U.S. PATENT DOCUMENTS

| | | | |
|---|---|---|---|
| 6,937,561 B2 | 8/2005 | Chiussi et al. | |
| 7,562,028 B1 * | 7/2009 | Donner | G06Q 30/0603 705/5 |
| 7,752,146 B2 | 7/2010 | Lert, Jr. | |
| 8,606,644 B1 * | 12/2013 | Bruckhaus | G06Q 30/00 705/26.1 |
| 9,110,715 B2 | 8/2015 | Otenko | |
| 11,061,727 B1 * | 7/2021 | Gnyp | G06F 18/23 |
| 2003/0103497 A1 | 6/2003 | Speight | |
| 2014/0223436 A1 | 8/2014 | Steiner | |
| 2019/0166056 A1 * | 5/2019 | Tang | H04L 43/00 |
| 2019/0306061 A1 * | 10/2019 | Lesartre | H04L 47/25 |

OTHER PUBLICATIONS

Success Stories Harvey Nichols, Jun. 5, 2019, Queue-it.com, accessed at [https://web.archive.org/web/20190605112931/https://queue-it.com/success-stories/harvey-nichols/] (Year: 2019).*
Robert Paprocki, How to Design a Scalable Rate, https://konghq.com/blog/how-to-design-a-scalable-rate-limiting-algorithm/ Dec. 19, 2017.

(Continued)

*Primary Examiner* — Michael Misiaszek
*Assistant Examiner* — Lindsey B Smith
(74) *Attorney, Agent, or Firm* — Rowand LLP

(57) ABSTRACT

Methods and systems for controlling access to resources. Receiving, at a server from user devices, requests associated with a resource. Transmitting, by the server to the user devices, tickets associated with the requests, each ticket associated with a respective one of a plurality of groups, the groups identifying requests received in successive windows of time. Receiving, at the server from one of the user devices, a subsequent request, the subsequent request identifying one of the tickets previously transmitted to that user device. Determining that the identified one of the tickets should be accepted and the subsequent request should be serviced.

20 Claims, 10 Drawing Sheets

(56) References Cited

OTHER PUBLICATIONS

OpenStack Docs: Rate Limiting, https://docs.openstack.org/swift/latest/ratelimit.html Aug. 12, 2020.
Hechao Li, Rate Limiting Part 1, https://hechao.li/2018/06/25/Rate-Limiter-Part1/ 1/ Jun. 25, 2018.
Rate-limiting strategies and techniques, https://cloud.google.com/solutions/rate-limiting-strategies-techniques#preventing_resource_starvation Jun. 22, 2020.
Emil Stolarsky, Surviving Flashes of High-Write Traffic Using Scriptable Load Balancers (Part 1) , https://shopify.engineering/surviving-flashes-of-high-write-traffic-using-scriptable-load-balancers-part-i Feb. 3, 2017.
Emil Stolarsky. Surviving Flashes of High-Write Traffic Using Scriptable Load Balancers (Part II), https://shopify.engineering/surviving-flashes-of-high-write-traffic-using-scriptable-load-balancers-part-ii Feb. 5, 2017.
Ticket lock, https://en.wikipedia.org/wiki/Ticket_lock Jan. 27, 2020.
Scheduling (computing), https://en.wikipedia.org/wiki/Scheduling_(computing)#Scheduling_disciplines Nov. 27, 2020.

* cited by examiner

SYSTEMS, MANUFACTURE, AND METHODS FOR CONTROLLING ACCESS TO RESOURCES

FIELD

The present disclosure relates to controlling access to resources and, in particular, to systems and methods for servicing and controlling access to highly-contended resources.

BACKGROUND

In many computing systems, a high volume of requests may be received suddenly in a short time. Throughput and servicing of these requests may be limited or throttled, either intentionally to avoid overloading resources or due to limited capacity of resources. Although various rate limiting techniques (e.g. leaky bucket queues) can be implemented to avoid or mitigate overloading resources, these techniques can be memory intensive, unfair, or may discard requests.

BRIEF DESCRIPTION OF THE DRAWINGS

Embodiments will be described, by way of example only, with reference to the accompanying figures wherein.

DETAILED DESCRIPTION

Figure 1:
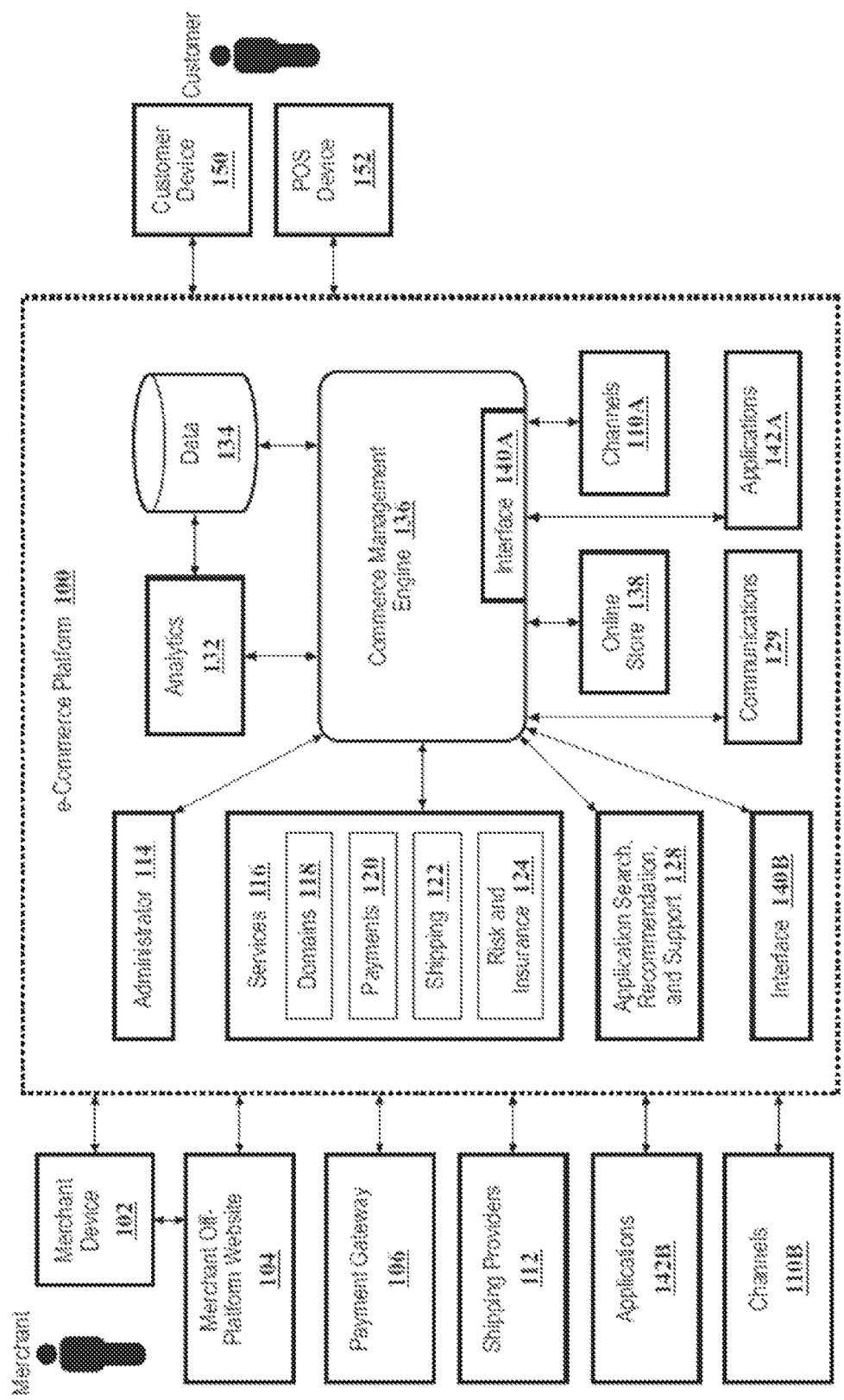
FIG. 1 is a block diagram of an e-commerce platform, according to one embodiment.

In one aspect, the present application describes a computer-implemented method for controlling access to resources. The method may include receiving, at a server from user devices, requests associated with a resource; transmitting, by the server to the user devices, tickets associated with the requests, each ticket associated with a respective one of a plurality of groups, the groups identifying requests received in successive windows of time, at least one of the plurality of groups identifying a plurality of requests; receiving, at the server from one of the user devices, a subsequent request, the subsequent request identifying one of the tickets previously transmitted to that user device; and determining that the identified one of the tickets should be accepted and the subsequent request should be serviced.

In some implementations, determining that the identified one of the tickets should be accepted is based on at least one of an observed utilization rate for the resource or an observed throughput rate for servicing requests associated with the resource.

In some implementations, the sizes of the groups may be based on a threshold number of requests.

In some implementations, the sizes of the groups may be based on a threshold length of time between the arrival time of the earliest request and the latest request identified by the respective groups.

In some implementations, the method may further include transmitting, to the one of the user devices, a response indicating that access to the resource is allowed.

In some implementations, the requests may be requests to access the resource.

In some implementations, the method may further include receiving, at the server from the one of the user devices, a second subsequent request, the second subsequent request identifying the one of the tickets previously transmitted to that user device; and determining that the identified one of the tickets should be rejected and the second subsequent request should not be serviced.

In some implementations, determining that the identified one of the tickets should be rejected may include determining that the identified one of the tickets is expired.

In some implementations, determining that the identified one of the tickets should be rejected may include determining that the identified one of the tickets is tampered with.

In some implementations, the resource may be a checkout function of an online store.

In some implementations, the method may include receiving, at the server from a second one of the user devices, a second subsequent request, the second subsequent request identifying a second one of the tickets previously transmitted to the second one of the user devices; in response to receiving the second subsequent request, determining that at least a portion of the content of an online shopping cart associated with the second subsequent request is out-of-stock; and transmitting, by the server to the second one of the user devices, a response indicating an out-of-stock condition.

In some implementations, the method may include receiving, at the server from a second one of the user devices, a second subsequent request, the second subsequent request identifying a second one of the tickets previously transmitted to the second one of the user devices; in response to receiving the second subsequent request, determining that an inventory level for a product variant is insufficient to fulfill a quantity of the product variant included in an online shopping cart associated with the second subsequent request; and transmitting, by the server to the second one of the user devices, a response indicating that the inventory level is insufficient to fulfill the order.

In some implementations, the resource may be a payment function, shipping rate function, tax rate function, credit card validation function, address validation function, postal or zip code validation function, order form validation function, order tracking function, order return function, currency conversion function, customer registration function, or a chat function connecting an online shopper with a customer service representative of an online store.

In another aspect, the present application describes a system including a processor; and a memory storing computer-executable instructions that, when executed by the processor, are to cause the processor to receive, from user devices, requests associated with a resource; transmit, to the user devices, tickets associated with the requests, each ticket associated with a respective one of a plurality of groups, the groups identifying requests received in successive windows of time, at least one of the plurality of groups identifying a plurality of requests; receive, from one of the user devices, a subsequent request, the subsequent request identifying one of the tickets previously transmitted to that user device; and determine that the identified one of the tickets should be accepted and the subsequent request should be serviced.

In some embodiments, the instructions, when executed by the processor, may cause the processor to transmit, to the one of the user devices, a response indicating that access to the resource is allowed.

In another aspect, the present application discloses a non-transitory, computer-readable medium storing processor-executable instructions that, when executed by one or more processors, are to cause the one or more processors to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, reference may be made to a request associated with a "resource". A resource may refer to a physical and/or intangible computer component that is used to service the request. Examples of a resource include a file, file handle, database, network connection, network socket, port (physical and virtual), processor (both time on a processor and use of multiple processors), thread (e.g. database threads), storage medium, computer memory, software module or application, webpage or a checkout function of an online store. In some cases, a resource includes a device or a server, such as a cloud server, file server, print server, database server, web server, and the like. A resource may also be provided as a service, including a cloud computing service, a software as a service (SaaS), and the like. In some cases, a resource may include a stand-alone component or service, such as, for example, a component or service external to an e-commerce platform.

In the present application, reference may be made to a "health metric". A health metric may refer to a metric that indicates the health or state of a resource or server. For example, a health metric may indicate that a resource or server is near or at full capacity or utilization. In some embodiments, a health metric may include response times, throughput, usage, or other performance metrics related to a resource, a server, or servicing a request. Examples of health metrics may include a utilization rate for a resource or a throughput rate for servicing requests associated with a resource. A health metric may be stored in memory that is accessible by the server.

In the present application, reference may be made to a "poll" request. When a request is transmitted by a user device to a server and subsequently retransmitted until the request is serviced, the initial request may be referred to as the original request and the subsequent retransmissions may be referred to as the poll requests. A poll request may be an automated request that is sent periodically by a user device and received by a server. A poll request may be sent/received at a regular interval, for example, every ten seconds, every minute, or every five minutes. An interval may be a defined length of time. In some embodiments, the defined length of time may range from a few seconds to a few minutes, or longer.

In the present application, reference may be made to a "window of time". A window of time may be a count based window or a time duration based window. The term "count based window" may refer to a window that has a defined count of the number of requests received and the term "duration based window" may refer to a window that has a defined time duration. The window length may refer to a count of the number of received requests or a time duration. In some embodiments, the count may range from a few requests to a few thousand requests, or more, and the duration may range from a few seconds to a few minutes, or longer. The count may include only the number of original requests, and not poll requests, received.

A window of time may represent the boundary of a group of received requests; that is, a group may identify requests that are received within a corresponding window of time. Requests that are received outside of that window of time may not be identified by the group.

A window of time may be non-overlapping with another window, in which case the time windows do not intersect and a received request may fall within only one of the windows.

A window length may match a group size. A group size may be a count of the number of requests identified by a group or the length of time between the arrival time of the earliest and latest requests identified by a group.

In the present application, reference may be made to a "policy". A policy may refer to a data structure or other information that includes a set of preferences, rules, conditions or other criteria for defining the behaviour of operations for controlling access to resources. By way of example, a policy may define a threshold value (e.g. window length or group size). The policy may include a merchant defined policy or a subscription plan (e.g. a fee structure indicating the level of service provided by an e-commerce platform to an online store). In some embodiments, a policy may be used to provide store-specific policy data that is customizable on a per-store basis. A policy may be stored in memory that is accessible by the server.

Example E-Commerce Platform

While not required, in some embodiments, the methods disclosed herein may be performed on or in association with an e-commerce platform. An example of an e-commerce platform will now be described.

FIG. 1 illustrates an e-commerce platform 100, according to one embodiment. The e-commerce platform 100 may be used to provide merchant products and services to customers. While the present disclosure contemplates using the apparatus, system, and process to purchase products and services, for simplicity the description herein will refer to products. All references to products throughout this disclosure should be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g. a seller, retailer, wholesaler, or provider of products), a customer-user (e.g. a buyer, purchase agent, or user of products), a prospective user (e.g. a user browsing and not yet committed to a purchase, a user evaluating the e-commerce platform 100 for potential use in marketing and selling products, and the like), a service provider user (e.g. a shipping provider 112, a financial provider, and the like), a company or corporate user (e.g. a company representative for purchase, sales, or use of products, an enterprise user, a customer relations or customer management agent, and the like), an information technology user, a computing entity user (e.g. a computing bot for purchase, sales, or use of products), and the like.

The e-commerce platform 100 may provide a centralized system for providing merchants with online resources and facilities for managing their business. The facilities described herein may be deployed, in part or in whole, through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g. a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g. "brick-and-mortar" retail stores), a merchant off-platform website 104 (e.g. a commerce Internet website or other internet or web property or asset supported by or on behalf of the merchant separately from the e-commerce platform), and the like. However, even such other merchant commerce facilities may be incorporated into the e-commerce platform, such as where POS devices 152 in a physical store of a merchant are linked to the e-commerce platform 100, where a merchant off-platform website 104 is tied to the e-commerce platform 100, such as through "buy buttons" that link content from the merchant off platform website 104 to the online store 138, and the like.

The online store 138 may represent a multitenant facility comprising a plurality of virtual storefronts. In some embodiments, merchants may manage one or more storefronts in the online store 138, such as through a merchant device 102 (e.g. computer, laptop computer, mobile computing device, and the like), and offer products to customers through a number of different channels 110A-B (e.g. an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure, the terms "online store" and "storefront" may be used synonymously to refer to a merchant's online e-commerce offering presence through the e-commerce platform 100, where an online store 138 may refer to the multitenant collection of storefronts supported by the e-commerce platform 100 (e.g. for a plurality of merchants) or to an individual merchant's storefront (e.g. a merchant's online store).

In some embodiments, a customer may interact through a customer device 150 (e.g. computer, laptop computer, mobile computing device, and the like), a POS device 152 (e.g. retail device, a kiosk, an automated checkout system, and the like), or any other commerce interface device known in the art. The e-commerce platform 100 may enable merchants to reach customers through the online store 138, through POS devices 152 in physical locations (e.g. a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g. accessed by users using a client, such as a thin client, via a web browser or other application, accessed through by POS devices, and the like). In some embodiments, elements of the e-commerce platform 100 may be implemented to operate on various platforms and operating systems, such as iOS™, Android™, on the web, and the like (e.g. the administrator 114 being implemented in multiple instances for a given online store for iOS™, Android™, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150, and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g. add products to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store 138 may implement a content management system for website content. Merchants may author blog posts or static pages and publish them to their online store 138, such as through blogs, articles, and the like, as well as configure navigation menus. Merchants may upload images (e.g. for products), videos, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g. through an e-commerce platform shipping facility or through a third-party shipping carrier), such as providing merchants with real-time updates, tracking, automatic rate calculation, bulk order preparation, label printing, and the like.

Figure 2:
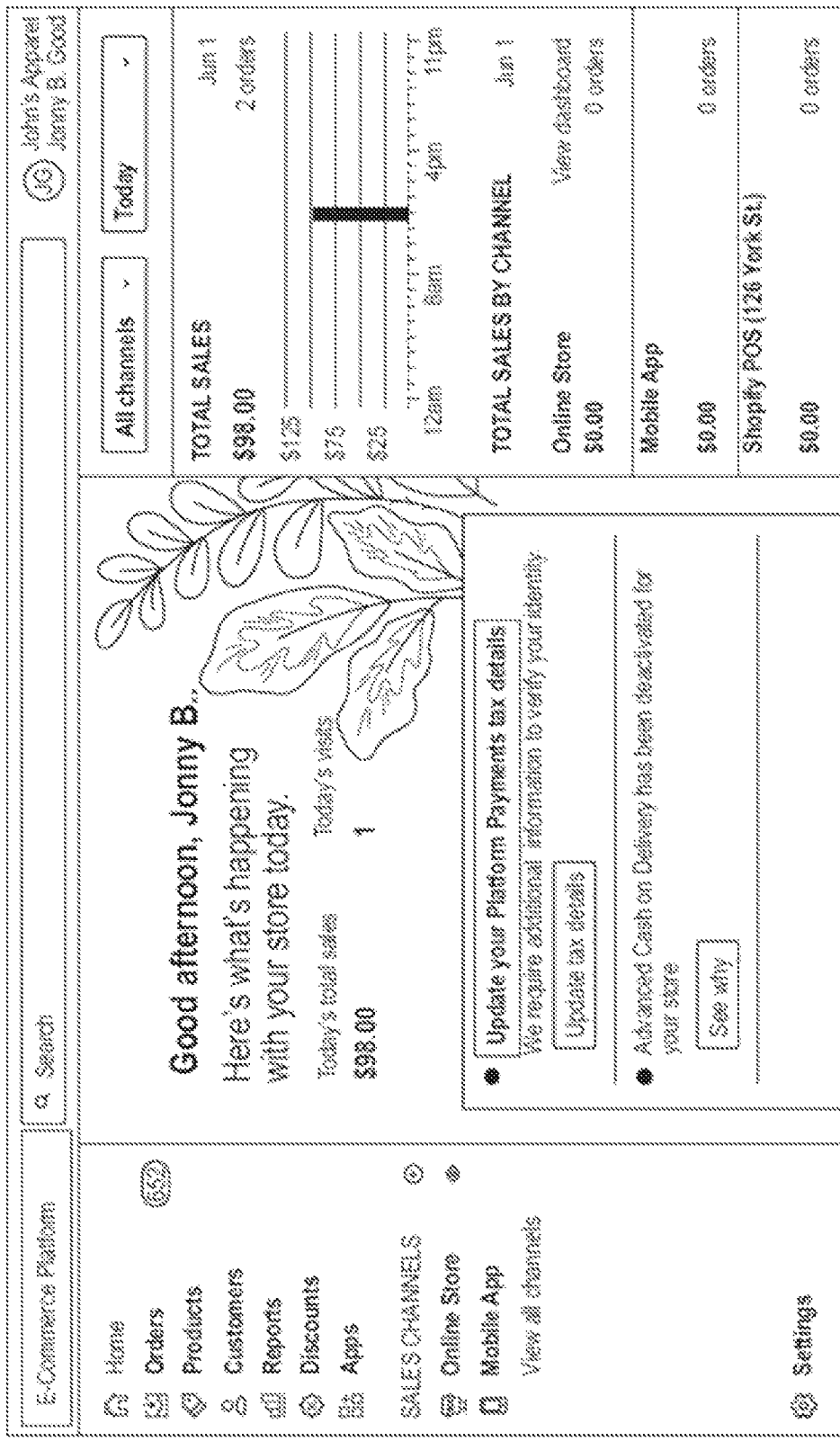
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store, POS devices, and/or a buy button. The administrator 114 may also include interfaces for managing applications installed on the merchant's account, and settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g. days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g. a card server), to reconcile financials, bill merchants, perform automated clearing house (ACH) transfers between an e-commerce platform 100 financial institution account and a merchant's bank account (e.g. when using capital), and the like. These systems may have Sarbanes-Oxley Act (SOX) compliance and a high level of diligence required in their development and operation. The financial facility 120 may also provide merchants with financial support, such as through the lending of capital (e.g. lending funds, cash advances, and the like) and provision of insurance. In addition, the e-commerce platform 100 may provide for a set of marketing and partner services and control the relationship between the e-commerce platform 100 and partners. They may also connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation, and data management to enable support and services to the plurality of online stores 138 (e.g. related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services. The applications 142A may be provided internal to the e-commerce platform 100 or applications 142B may be provided from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g. sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion in the commerce management engine 136 may need to exceed a core functionality threshold through which it may be determined that the function is core to a commerce experience (e.g. common to a majority of online store activities, such as across channels, administrator interfaces, merchant locations, industries, product types, and the like), is re-usable across online stores 138 (e.g. functions that can be re-used/modified across core functions), limited to the context of a single online store 138 at a time (e.g. implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a rapid and accurate checkout. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. Thus, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g. that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g. app: "engine, surface my app data in mobile and web admin using the embedded app SDK"), and/or where the commerce management engine 136 is able to ask the application to perform work on demand (e.g. engine: "app, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as by utilizing APIs to expose the functionality and data available through and within the commerce management engine 136 to the functionality of applications (e.g. through REST, GraphQL, and the like). For instance, the e-commerce platform 100 may provide API interfaces 140A-B to merchant and partner-facing products and services, such as application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g. as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g. merchandising, inventory, discounts, fulfillment, and the like) and online store tasks (e.g. applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over or be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, for synchronizing a local database, notifying an external integration partner, and the like. Update events may enable this functionality without having to constantly poll the commerce management engine 136 to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g. via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128 functionalities. Application search, recommendation and support 128 may include developer products and tools to aid in the development of applications, an application dashboard (e.g. to provide developers with a development interface, to administrators for management of applications, to merchants for customization of applications, and the like), facilities for installing and providing permissions with respect to providing access to an application 142A-B (e.g. for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized for application development performed by any entity, including the merchant developing their own application 142A-B, a third-party developer developing an application 142A-B (e.g. contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g. through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g. the online store, applications for flash sales (e.g. merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g. through applications related to the web or website or to mobile devices), run their business (e.g. through applications related to POS devices), to grow their business (e.g. through applications related to shipping (e.g. drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g. a "default variant" is created for a product without any options). To facilitate browsing and management, products may be grouped into collections, provided product identifiers (e.g. stock keeping unit (SKU)) and the like. Collections of products may be built by either manually categorizing products into one (e.g. a custom collection), by building rulesets for automatic classification (e.g. a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g. for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g. in an abandoned checkout feature). For those reasons, checkouts can have much longer lifespans than carts (hours or even days) and are therefore persisted. Checkouts may calculate taxes and shipping rates based on the customer's shipping address. Checkout may delegate the calculation of taxes to a tax component and the calculation of shipping rates to a delivery component. A pricing component may enable merchants to create discount codes (e.g. "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g. a set of prerequisites that when met imply a set of entitlements). For instance, prerequisites may be items such as "the order subtotal is greater than $100" or "the shipping rate is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g. online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g. where the customer is redirected to another website), manually (e.g. cash), online payment methods (e.g. online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g. order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts, to avoid over-selling (e.g. merchants may control this behavior from the inventory policy of each variant). Inventory reservation may have a short time span (e.g. minutes) and may need to be very fast and scalable to support flash sales (e.g. a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order, or incoming from an inventory transfer component (e.g. from a vendor).

The merchant may then review and fulfill (or cancel) the order. A review component may implement a business process merchants use to ensure orders are suitable for fulfillment before actually fulfilling them. Orders may be fraudulent, require verification (e.g. ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g. credit card information) or wait to receive it (e.g. via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g. at merchant managed locations) used when the merchant picks and packs the products in a box, purchase a shipping label and input its tracking number, or just mark the item as fulfilled. A custom fulfillment service may send an email (e.g. a location that doesn't provide an API connection). An API fulfillment service may trigger a third party, where the third-party application creates a fulfillment record. A legacy fulfillment service may trigger a custom API call from the commerce management engine 136 to a third party (e.g. fulfillment by Amazon). A gift card fulfillment service may provision (e.g. generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period (e.g. 30 days) of the original order date. The business process merchants may go through to "un-sell" an item may be implemented by a return component. Returns may consist of a variety of different actions, such as: a re-stock, where the product that was sold actually comes back into the business and is sellable again; a refund, where the money that was collected from the customer is partially or fully returned; an accounting adjustment noting how much money was refunded (e.g. including if there was any restocking fees, or goods that weren't returned and remain in the customer's hands); and the like. A return may represent a change to the contract of sale (e.g. the order), and where the e-commerce platform 100 may make the merchant aware of compliance issues with respect to legal obligations (e.g. with respect to taxes). In some embodiments, the e-commerce platform 100 may enable merchants to keep track of changes to the contract of sales over time, such as implemented through a sales model component (e.g. an append-only date-based ledger that records sale-related events that happened to an item).

Controlling Access to Resources

Online stores may encounter heavy load. For example, particularly heavy demand may need to be serviced in supporting flash sales and high demand product launches. In many cases, such events place a tremendous strain on e-commerce systems and third party resources, particularly when millions of customers concurrently attempt and/or complete checkout. Customers that are unable to checkout may simply keep retrying until they are able to do so.

One way to mitigate overloading systems is to implement a rate limiting technique. For example, requests may be stored in a queue in memory and then may be de-queued on a first-in-first-out (FIFO) basis. Unfortunately, queues can be memory intensive due to the storage of the requests in memory. In addition, sometimes the finite capacity of a queue may not be large enough to hold all of the requests and the requests that overflow the queue may be discarded. Furthermore, customers may choose to leave rather than wait for the checkout to complete. This may result in abandoned and stale requests being left in the queue that unnecessarily consume memory and resources. The proposed solutions disclosed in the present application address technical limitations associated with controlling access to resources including, potentially, one or more of the foregoing example technical limitations.

Reference is now made to FIGS. 3 to 7, which show various methods 300-700 related to controlling access to resources. These various methods may be implemented by one or more servers suitably programmed to carry out the functions described. The server may be configured to receive or respond to communications from one or more user devices. A user device may be implemented by a customer device, such as the customer device 150 of FIG. 1. The server may include a server of the example e-commerce platform 100 of FIG. 1; however, a server implementation in an e-commerce platform is only one example. The operations may also be implemented on any device or server, as a stand-alone component or service that is external to an e-commerce platform. In some embodiments, the operations may be provided as a cloud computing service, a software as a service (SaaS), and the like, in the form of a downloadable application that is available for installation in relation with an on-line store (or a merchant account) or in the form of a downloadable application available for installation by a customer. Other possibilities exist. For example, more broadly, the various operations and techniques described herein may be employed in other application domains than e-commerce. In a particular example, the subject matter of the present application could be used to control access to contended resources of other manners of computing services such as, for example, various cloud based services.

The server may communicate with user devices via a stateless protocol, such as the Hypertext Transfer Protocol (HTTP), or via a stateful protocol. The communication may occur with or without session management. Session management techniques may involve using a unique identifier such as, for example, a cookie or request parameter to allow a server to track/correlate requests from the same user device.

Many of the embodiments described herein focus on web-based requests that use HTTP. However, it is understood that the present application is not limited to such embodiments and that the embodiments described generally can easily be extended to the servicing of non-web-based requests.

The server may include a ticket control engine that manages the servicing of requests and thereby controls access to resources associated with the requests. The ticket control engine may dispense tickets in response to requests that do not include tickets and may also determine when ticket control should be enforced. When ticket control is enforced, the engine may determine whether to accept a particular ticket that is included in a request. The request may be serviced only when the ticket is accepted.

Figure 3:
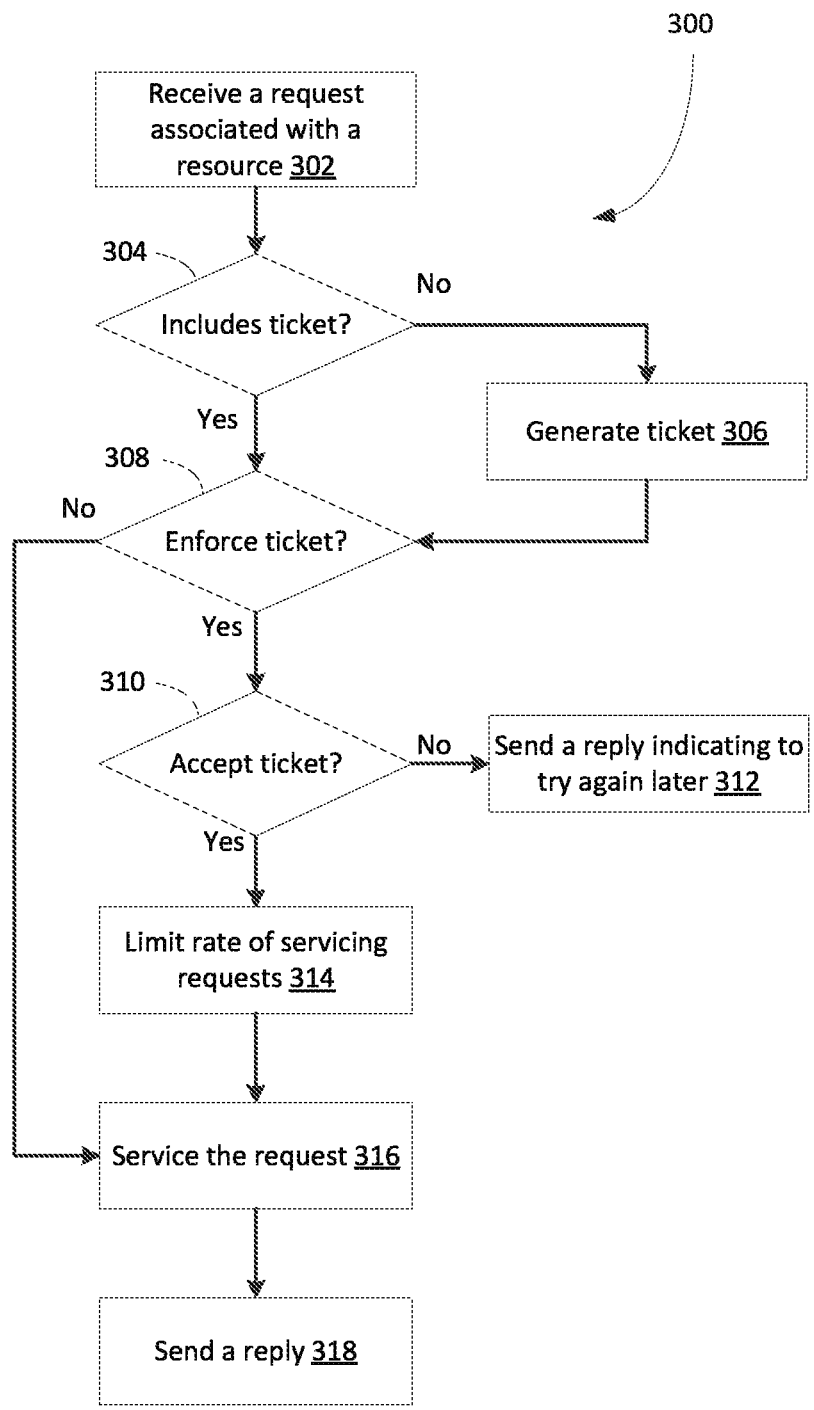
FIG. 3 shows, in flowchart form, an example method for controlling access to resources, according to one embodiment.

Reference will now be made to FIG. 3, which shows, in flowchart form, a simplified example method 300 for controlling access to resources.

The method 300 includes a two phase feedback loop. In a first phase, sometimes referred to as a grouping or scheduling phase, requests are grouped and the groupings are used to regulate the order in which requests are accepted for servicing. In a second phase, sometimes referred to as a rate limiting phase, requests are serviced using a rate limiter. The throughput rate for servicing requests may be fed back to the first phase to determine whether to accept more requests for servicing.

In operation 302, the first phase may commence when the server receives, from a user device, a request associated with a resource. The request may be associated with or indicate an action to be taken by the server. The action may include or involve accessing the resource.

In some cases, the request may indicate a manual action taken by a user of the user device. In some embodiments, receiving a request may involve receiving user input from the user device, via an actionable user interface element, for proceeding to checkout or purchasing a particular product immediately. For example, the request may indicate a user selection of a "Proceed to Checkout" button or a "Buy Now" button on a webpage of an online store hosted on the e-commerce platform. Examples of resources that may be associated with the request include a checkout function, payment function, shipping rate function, tax rate function, credit card validation function, address validation function, postal or zip code validation function, order form validation function, order tracking function, order return function, currency conversion function, new customer registration function, and a chat function connecting a user of the user device with a customer service representative of an online store.

In operation 304, the server may determine whether the request includes a ticket. In this example, the request may or may not include a ticket. If the request is an original request, the user device typically will not have a ticket to include in the request and, accordingly, may transmit the request to the server with no ticket. Otherwise, if the request is a poll request, the user device may include the ticket, which it previously received, in the poll request or otherwise associated with or attached to the poll request sent to the server.

If the request does not include a ticket, then in operation 306 the server may generate a ticket associated with a group identifying requests received in a window of time.

In operation 308, the server may determine whether ticket control is enforced. In some cases, if ticket control is not already enforced, the server may determine whether to enforce ticket control and, if appropriate, may enforce ticket control.

If ticket control is not enforced, then the server may in operation 316 service the request. Otherwise, the server may in operation 310 determine whether to accept the ticket. The determination may be based on, for example, at least one of an observed utilization rate for the resource or an observed throughput rate for servicing requests associated with the resource.

If the ticket is accepted, then the server may in operation 314 commence the second "rate limiter" phase. Otherwise, the server may, in operation 312, transmit to the user device a reply indicating that the ticket is refused (i.e. not accepted for the time being). In this case, the server does not service the request. In some embodiments, the reply in operation 312 may direct the user device to display a waiting area webpage. The waiting area webpage may be presented as a graphical user interface associated with a browser application that transmitted the request.

The reply may also include a suitable delay value to be used by the user device. The delay may indicate a duration or period of the time that the user device is to wait before retransmitting the request. The delay value is sometimes referred to as a "poll delay".

The reply may also include a poll Uniform Resource Identifier (URI) to be used by the user device when retransmitting the request. The poll URI may be different from the URI that is used by the user device to transmit the request received in operation 302.

The reply may also include a ticket. If the request includes a ticket, then the server may include that ticket in the reply. In some embodiments, the ticket that is included in the reply may be updated with, for example, the poll delay. Alternatively, if the request does not include a ticket, then the server may include a newly generated ticket in the reply.

Upon receiving the reply, the user device may wait for the period specified by the poll delay before transmitting the ticket back to the server in a poll request. If the reply includes a poll URI, then the poll request may be transmitted as an HTTP request, such as a GET request or a POST request, to the poll URI.

In operation 314, the server may regulate, using a rate limiter, the rate of servicing requests associated with the resource, including the request received in operation 302. Any suitable rate limiting mechanism or algorithm may be used. For instance, the rate limiter may be any of a leaky bucket mechanism, a token bucket mechanism, or a windowing mechanism. Examples of windowing mechanisms include fixed window and sliding window rate limiters.

A rate limit may be defined in terms of the maximum number of requests that are to be accepted for servicing in a fixed period of time. By way of example, a rate limit may specify a maximum of two thousand requests per second. In some embodiments, the rate limit is defined in a policy stored in the data facility 134. The rate limit may also be dynamically adjusted based on an observed health metric associated with the server or resource.

When the rate limiter is a fixed window mechanism, the rate limiter may be implemented using a counter. The server counts the number of occurrences of tickets being accepted in a period of time defined by the rate limit, for example, one second. In other words, each time a ticket is accepted, the server increments the counter. The counter is then compared to a threshold number of requests defined by the rate limit, for example, ten thousand. If the counter does not exceed the threshold, then the rate limit is not met and the server may in operation 316 service the request. If the counter exceeds the threshold, then the rate limit is met and the server may instead transmit a reply to the user device without servicing the request. The reply may be similar to the reply in operation 312, except the reply may also indicate that the request is refused servicing due to rate limitations.

In operation 316, the server may service the request. Servicing the request may involve accessing the resource that is associated with the request. Accessing a resource may include using, updating, modifying, deleting, or otherwise interacting with a resource or portions thereof. Specific examples of accessing a resource include obtaining a file from a file server, retrieving data from a database, and interacting with a software module or service.

In operation 318, the server may send a reply to the user device. The reply may, for example, indicate that the request was serviced.

The server may continue to receive requests from the user device or from other user devices. Each of the requests may be handled in the manner described in the method 300. The server may process and respond to the requests from user devices concurrently. For example, the server may process and reply to a request while processing and replying to the next request.

Figure 4:
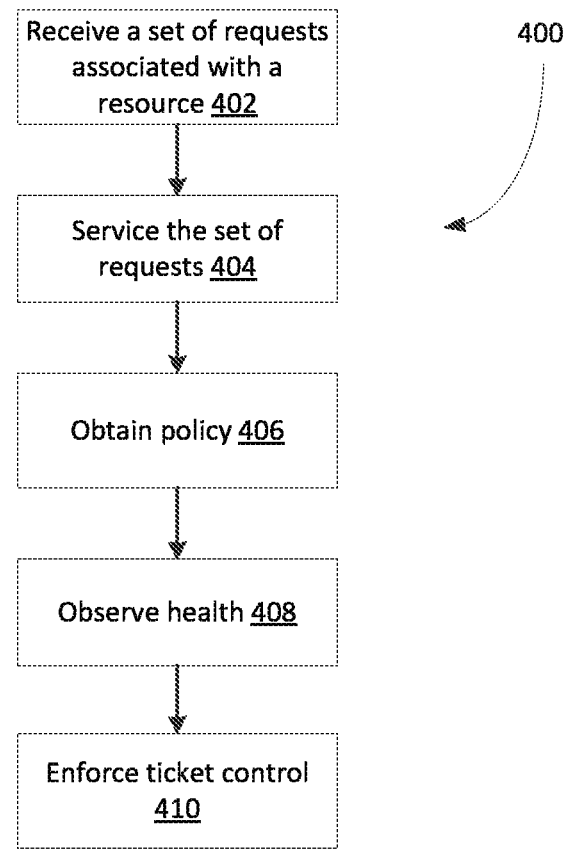
FIG. 4 shows, in flowchart form, an example method for enforcing ticket control, according to one embodiment.

Reference will now be made to FIG. 4, which shows, in flowchart form, a simplified example method 400 for enforcing ticket control. The example method 400 involves requests that are sent from one or more user devices to a server. In some embodiments, each request may be sent from a respective user device.

In operation 402, the server receives a set of requests associated with a resource. The set of requests may be a burst of requests that includes numerous requests within a short period of time. In some embodiments, the number of requests may range from hundreds to thousands or millions of requests and the period of time may range from a few seconds to a few minutes, or a few hours, or longer. The set of requests may correspond to the requests 802a and 802b shown in FIG. 8.

In operation 404, the server services the set of requests. It will be appreciated that the server may service one or more requests of the set of requests concurrently. For example, the server may service requests 802a and 802b (FIG. 8) concurrently. While the server is servicing the set of requests, the server may concurrently receive further requests associated with the resource. These further requests may, similarly, be serviced in parallel with each other, with the earlier in-flight requests, and or serially with some or all of the other requests (earlier or further).

At this stage of the example method 400, the resource may be underutilized or, alternatively, at or near its maximum capacity. In some cases, the resource may be overloaded by the requests.

In operation 406, the server may obtain a policy. In some embodiments, the policy may be retrieved from the data facility 134. The policy may specify, for example, a threshold utilization or throughput rate. In some embodiments, the policy may be a preventative policy that provides interchangeable options having differing resource utilization requirements. For instance, an option may be for an online store to use either a lightweight "flat-rate" tax function or a heavyweight "non-flat-rate" tax function. The lightweight option may have low resource utilization requirements whereas the heavyweight option may be comparatively more resource intensive. The preventative policy may indicate the merchant's preferred function or option and the online store may initially be configured to use that preferred function or option.

The policy may indicate a selection of one of a plurality of options. In some embodiments, at least one of the plurality of options may be associated with a resource that is internal to the server and at least one of the plurality of options may be associated with a resource that is external to the server. In some embodiments, at least one of the plurality of options may be associated with an in-house resource and at least one of the plurality of options may be associated with a third-party resource. An external or third-party resource may have different resource utilization requirements and response times than an internal or in-house resource. By way of example, an option may be for selecting an internal or in-house "flat-rate" tax function and another option may be for selecting an external or third-party "non-flat-rate" tax function. Interactions, such as, for example, application programming interface calls, between the server and the external or third-party function may be slower, more resource intensive, and have longer response times than interactions with an internal or in-house function within the server.

In operation 408, the server may observe a health metric associated with the server or resource. Observing a health metric may involve, for example, measuring, determining or monitoring a health metric in real-time. In some embodiments, a monitoring service is used to measure and monitor a health metric. For example, if the resource is external to the server, the resource may provide a monitoring service that transmits notifications to the server to provide an up-to-date health metric.

In some embodiments, server may update the policy based on the observed health metric. For example, if the server determines there exists excess capacity, the server may update the policy to select an option that is more resource intensive than a currently selected option. For example, the server may switch from using the flat-rate tax function to the non-flat-rate tax function. Conversely, if the server determines that there is a high load, the server may update the policy to select an option that is less resource intensive than a currently selected option. For example, the server may switch from using the non-flat-rate tax function to the flat-rate tax function. Conveniently, in this way, the server may provide a feedback loop between the observed health metric and the policy and in doing so may conserve resources and possibly mitigate the need to enforce ticket control.

In some embodiments, the policy may be statically configured, for example, by a merchant via a user interface provided by the server. When a policy is statically configured, the server may not dynamically update the policy to, for example, switch between various functions.

An initial rate limit, threshold utilization or threshold throughput rate may be based on the policy and adjusted higher or lower before any requests are received by the server in associated with an online store operated by the merchant. For example, a merchant may configure a static policy to use an external resource, third-party service or software product. Since communications and interactions with external resources, for example calls by the server to a software interface of the external resource, may be more expensive than communications and interactions with internal resources, the server may adjust lower an initial rate limit or a threshold throughput rate based on the policy. The initial rate or threshold may subsequently be increased or decreased based on the load observed.

In operation 410, the server determines whether to enforce ticket control. The determination may be based on the observed health metric or the policy and may involve a comparison with a threshold. For example, the observed utilization rate or observed throughput rate may be compared with a threshold rate. If the comparison indicates that the observed utilization rate or the observed throughput rate is above a threshold value, then the server may enforce ticket control. Otherwise, the server may not enforce ticket control.

In some embodiments, the determination may be based on inventory levels and restocking events that occur after an item is out-of-stock. In particular, the server may determine that the inventory status for an item has changed from being out-of-stock to being stocked. For example, the server may detect that an item that became out-of-stock during a flash sale has been restocked. Accordingly, the server may anticipate that additional requests associated with orders for the item will be received by the server and that these requests will increase the load on the server. In response, the server may enforce ticket control. In this way, ticket control may be enforced without the observed utilization rate or observed throughput rate having reached a threshold.

Figure 5:
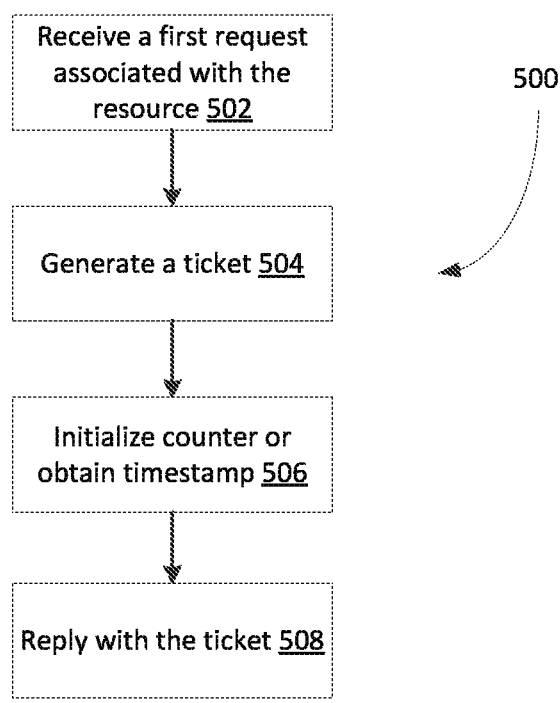
FIG. 5 shows, in flowchart form, an example method for dispensing a ticket in response to a first request received by the server, according to one embodiment.

Reference will now be made to FIG. 5, which shows, in flowchart form, an example method 500 for dispensing a (virtual) ticket in response to receiving a first request associated with a resource, according to one embodiment. In some embodiments, tickets may be dispensed only after ticket control is enforced and in such cases the method 500 may be used to process the first request received by the server after enforcing ticket control.

In operation 502, the server receives a request associated with the resource. The request may correspond to the request 802c shown in FIG. 8. It will be appreciated that operation 502, although shown separately for ease of discussion, may, in at least some implementations, be performed concurrently with operation 404 of FIG. 4 as the previous requests are serviced.

In operation 504, the server generates a ticket. The server may store data regarding the ticket in a ticket object. The ticket object may be a data structure and may include one or more data fields. Example data fields include a unique ticket identifier, a group identifier, a timestamp representing the arrival time of the original request, a poll delay, and a poll URI.

In some embodiments, the ticket object is implemented as an integer or any other data type that represents a numerical value.

In some embodiments, the ticket object is implemented as a timestamp. The timestamp may correspond to the time and date the request is received from the user device, the time and date the ticket is generated, or any other suitable time and date. In cases where it may be necessary to be able to differentiate between tickets, the timestamp may need to be sufficiently fine grained such that each ticket is unique. In some cases, the timestamp could be a monotonic increasing counter.

The ticket may be indicative of whether the corresponding group comes before or after some other group. In other words, tickets may be comparable and orderable, such that the server can determine whether a ticket comes "before" or "after" some other ticket.

In some implementations, tickets may only be uniquely identified but only partially ordered. For example, as further described below, tickets may be grouped into groups. In some implementations, it may be that each ticket is unique but tickets of a given group are only ordered relative to tickets of other groups (e.g., it can be determined whether a given ticket is of a group that comes "before" or "after" a ticket from another group), but it cannot be determined whether a ticket of a particular group is "before" or "after" another ticket of that same group. In a particular example, it could be that a given ticket has an identifier composed of data of a number of fields such as, for example, a group id field and a unique id field. Unique ids may be generated in a variety of manners such as, for example, by employing a UUID generated in a manner described in IETF RFC 4122 (Leach, P., Mealling, M., and R. Salz, "A Universally Unique IDentifier (UUID) URN Namespace", RFC 4122, DOI 10.17487/RFC4122, July 2005, <available: https:// www.rfc-editor.org/info/rfc4122>), the contents of which are herein incorporated by reference in their entirety. Additionally or alternatively, in some implementations, ticket identifiers may encode additional metadata. For example, ticket identifiers, whether ordered or partially ordered, may be composed of a number of fields and those fields may include one or more checksums or fingerprints intended to detect errors and/or tampering. For example, a field could include a random value in an effort to make tickets unpredictable to an attacker. Additionally or alternatively, a field may include cryptographic material such as, for example, a digital signature intended to make a ticket resistant to tampering and/or to prevent counterfeiting of tickets by an attacker.

Many of the embodiments described herein focus on tickets that are simple integers. However, it is understood that the present application is not limited to such embodiments and that the embodiments described generally can easily be extended to use tickets that are implemented using other objects and data structures.

In the following example, tickets will be simple integers generated sequentially for the sake of clarity. As such, the first ticket to be generated may be assigned a value of "1". Subsequent tickets may be generated by incrementing the current ticket by one. The generated ticket may be referred to as the current ticket. In other words, each time the server generates a ticket, that ticket becomes the current ticket. The server may keep track of the current ticket by storing it in memory.

The generated ticket is associated with a group identifying requests received by the server in a window of time. The window of time includes the arrival time of the request received in operation 502. The term "current group" may refer to the group associated with the current ticket. Similarly, the term "current window of time" may refer to the window of time associated with the current group and current ticket.

In operation 506, the server tracks information relating to the size of the current group. The information that is tracked may depend on whether the current window is a count based window or a duration based window. Although involving a windowing algorithm, the operation 506 relates to the "grouping" phase and should not be confused with the rate-limiters discussed in the "rate limiting" phase.

When the current window is a count based window, the server may track the number of requests that are associated with the ticket. In some embodiments, this may involve tracking the number of times the ticket is transmitted to the user devices. The tracking may be implemented using a numerical counter that is stored in memory. The counter may have an initial value of zero. When the server sends a reply with the ticket, the counter may be incremented by one. In other words, the counter may be incremented each time the ticket is dispensed by the server to a user device in response to an original request.

When the current window is a duration based window, the server may obtain a timestamp indicating the arrival time of the request and may store this timestamp in memory. The timestamp may be referred to as the timestamp of the first request received in the current window of time. This timestamp may mark the time at which the current window of time begins.

In some embodiments, the current window may be constrained in both count and duration, in which case the server may store both the counter and the timestamp in memory.

In operation 508, the server replies with the ticket to be included in a subsequent retransmission of the request by the same user device that sent the first request. By sending the ticket in reply to the request, the ticket may be considered to be associated with the request. As discussed briefly above, in some embodiments, the ticket may be generated in manners intended to prevent counterfeiting. For example, one or more of the timestamp, ticket number or other "ranking" indicia that is transmitted may be obscured or encrypted by the server, such as using a hash function or the like, so that a malicious user device cannot generate a fake ticket to "jump the queue". Additionally or alternatively, tickets may also be transmitted with metadata, such as one-time token or a short expiry time, to be used to determine whether a request is a replay attack.

Figure 6:
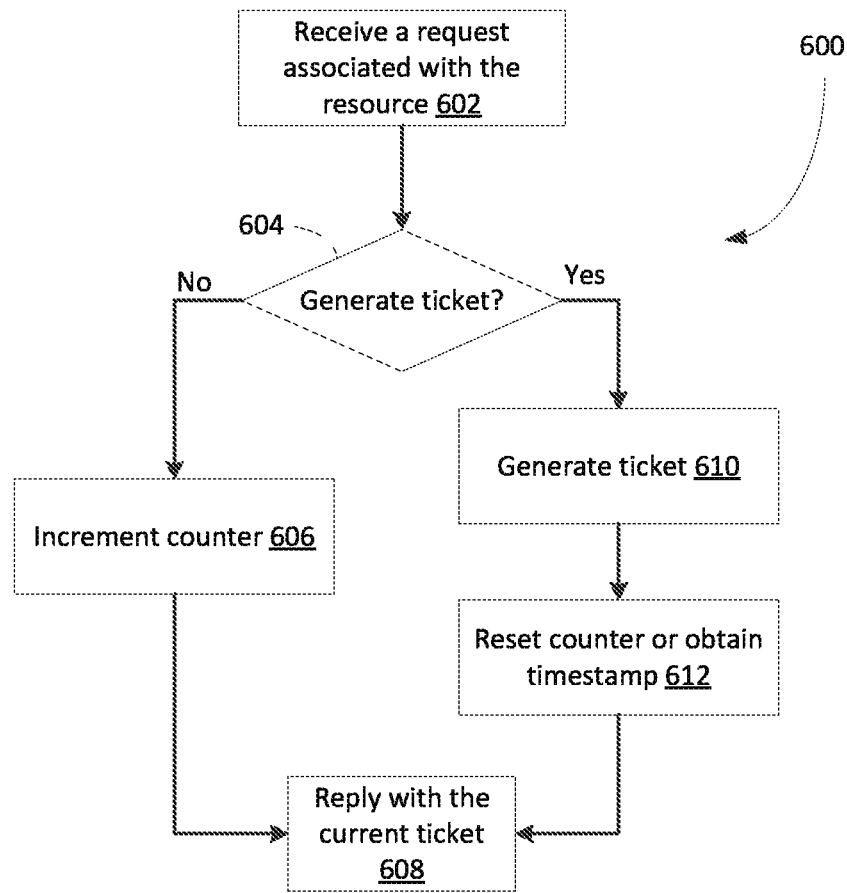
FIG. 6 shows, in flowchart form, an example method for dispensing a ticket in response to an original request that is subsequent to the original request of FIG. 5, according to one embodiment.

Reference will now be made to FIG. 6, which shows, in flowchart form, an example method 600 for dispensing a ticket in response to an original request that is subsequent to the first request of FIG. 5, according to one embodiment. Although operating using a windowing algorithm, the method 600 relates to the "grouping" phase and should not be confused with the rate-limiters discussed in relation to the "rate limiting" phase.

In operation 602, the server receives the subsequent original request associated with the resource. The request may correspond to the request 802d shown in FIG. 8.

In operation 604, the server determines whether to generate a new ticket. This determination may involve determining whether the request should be a member of the current group or whether the request should be a member of a new group. Put another way, the server may determine whether the window length of the current window would exceed a threshold if the request were to fall within the current window.

If the current window is a count based window, then the server may determine whether the current group is "full". The determination may be implemented by comparing the size of the current group, as indicated by the counter, with a threshold size. In some embodiments, threshold size may be based on a policy and may range from a few requests to a few thousand requests, or more.

If the counter is determined to be below the threshold, then the current group is not full and the server may associate the request with the current group. This may involve, in operation 606, incrementing the counter and, in operation 608, sending the current ticket to the user device. Otherwise, in operation 610, the server may generate a new ticket, and in operation 612, reset the counter to one. In operation 608, the server may then send the new ticket, now referred to as the current ticket, to the user device.

Referring back to operation 604, if the current window is a duration based window, then the server may compare the arrival time of the first request received in the window to the arrival time of the request received in operation 602. The difference between the arrival times may be compared with a threshold length. In some embodiments, the threshold length may be based on a policy and may range from a few seconds to a few minutes, or longer.

If the difference between the arrival times is determined to be below a threshold length, then the server may associate the request with the current group. This may involve, in operation 608, sending the current ticket to the user device while skipping the operation 606. Otherwise, in operation 610, the server may generate a new ticket, and in operation 612, store the arrival time of the request. In operation 608, the server may then send the new ticket, now referred to as the current ticket, to the user device. In this manner, the length of time between the arrival of the earliest request and the latest request associated with the current group may remain under the threshold duration.

The server may continue to receive a series of requests from user devices. Each of the requests may be handled in the manner described in the method 600 of FIG. 6. The server may receive, processes and respond to the requests concurrently. By applying the method 600 to a series of requests, the server may partition the series of requests into two or more groups based on a threshold group size and transmit tickets that are associated with the same group in reply to requests that are members of the same group and are received in the same window of time. In the case of count based windows, the first group identifies the first requests 1 through n in a first window of time, a second group identifies the subsequent requests for n+1 through 2n in a second window of time, and so on. In this manner, tickets associated with the same group may be dispensed in reply to a set of consecutive requests. In particular, in the case where the ticket is an object that includes a unique identifier field and a group identifier, the tickets that are dispensed in reply to a set of consecutive requests may be unique, but the group associated with those tickets may be the same.

A group may identify one or more, or a plurality, of requests in a window of time. In some embodiments, the server partitions the series of requests into a plurality of groups, with each respective group, or one or more of the plurality of groups, identifying one or more, or a plurality, of requests in the series of requests.

Many of the embodiments described herein focus on either count based windows or duration based windows. However, it is understood that the present application is not limited to such embodiments and that the embodiments described generally can easily be extended to other windowing mechanisms, such as, for example, windows that are both count based and duration based. That is, the window length may be capped in both count and duration.

Figure 7:
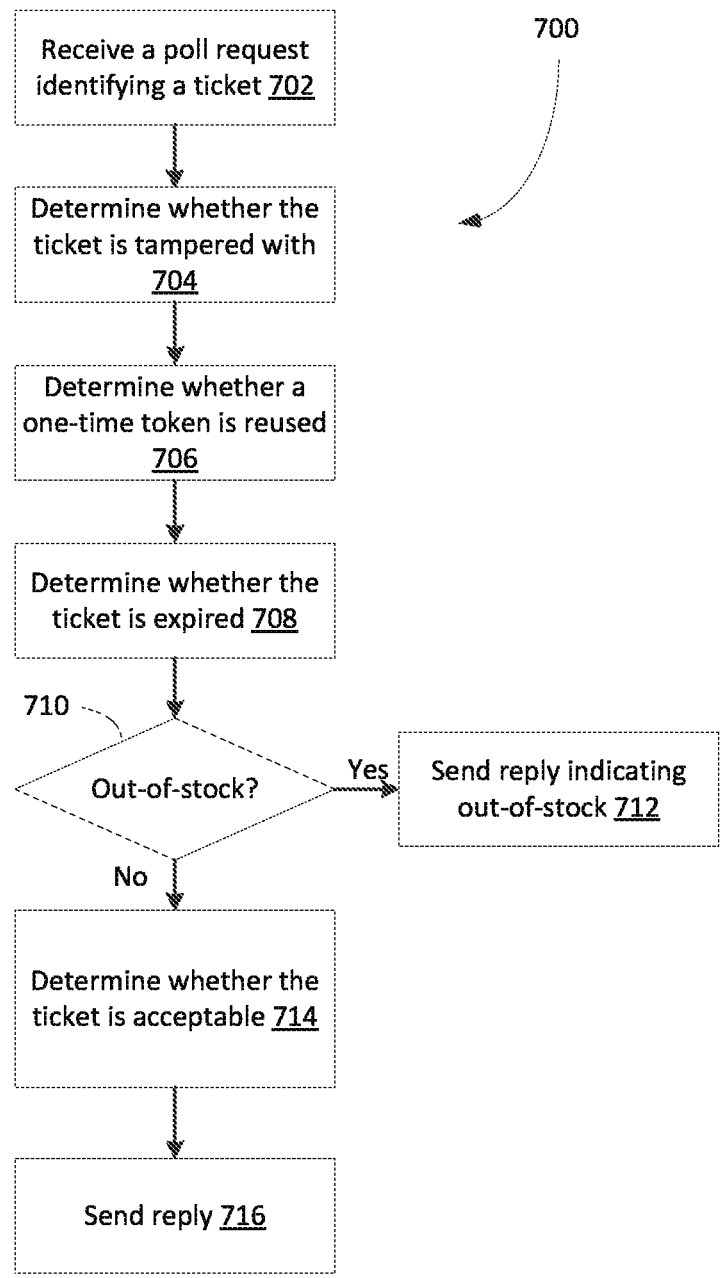
FIG. 7 shows, in flowchart form, an example method for processing a poll request, according to one embodiment.

Reference will now be made to FIG. 7, which shows, in flowchart form, a simplified example method 700 for processing a poll request, according to one embodiment. The method 700 may follow the method 600 of FIG. 6.

In operation 702, the server receives from one of the user devices a request identifying one of the tickets previously transmitted to that user device. This request may be referred to as a poll request.

In operation 704, the server may determine whether the identified ticket is tampered with. In some embodiments, before a server transmits a ticket to a user device, the ticket is encrypted and signed by the server and transmitted in that format. The user device then includes the encrypted and signed ticket in the poll request. When the server receives back the ticket in the poll request, the server decrypts the received ticket and verifies the signature. In this manner, if the server is unable to decrypt the identified ticket or verify the signature, then the identified ticket may be considered tampered with. If the ticket is tampered with, then the ticket should be rejected and the request should not be serviced.

In operation 706, the server may determine whether a one-time token is reused. In some embodiments, the server may mitigate replay attacks and cookie sharing through the use of one-time session tokens that are stored server-side once they have been used. Before a server transmits a reply to a user device, the server generates a random token, stores the token on the server in a session associated with the reply, and includes the token in the transmission to the user device. The user device then includes the token in the subsequent request to the server. The server then receives the request and the token. If the received token matches the token that is stored in the session, then the server processes the request, invalidates the token, and generates a new random token to be used in the next reply to the user device. Otherwise, if the received token does not match the token that is stored in the session, the server may determine that the one-time token has been reused and that the ticket should be rejected and the request should not be serviced.

In operation 708, the server may determine whether the ticket is expired. In some embodiments, the server may mitigate replay attacks and cookie sharing by including a short expiration time in replies sent to the user device. Before a server transmits a ticket to a user device, the server generates an expiration time and encodes the expiration time in the transmission to the user device. The user device then includes the expiration time in the subsequent request to the server. The server then receives the request and the expiration time. If the expiration time is before the arrival time of the request, then the server determines that the ticket should be rejected and the request should not be serviced.

In operation 710, the server may determine whether at least a portion of the content of an online store 138 cart associated with the request is out-of-stock. If so, then the server determines that the ticket should be refused and the server may transmit a response in operation 712 indicating the out-of-stock condition. In this case, even though the request is not serviced, the user device may cease sending the poll requests to the server.

More particularly, as discussed above, the online store 138 cart may be composed of multiple cart line items, where each cart line item tracks the quantity for a product variant. Each product variant may have a corresponding inventory level that indicates the quantity of that product variant that is available for sale and not committed to an order. The quantity of each product variant in the cart may be compared with an inventory level for the respective product variant. If an inventory level is insufficient to fulfill the corresponding quantity specified in the cart, then the request may be refused and the server may transmit a reply indicating that the inventory level is currently insufficient to fulfill the order.

In operation 714, the server determines whether the ticket is acceptable. The determination may be based on a comparison of the group associated with the ticket and a "working" group. If the group associated with the ticket is earlier than or matches the working group, then the ticket is acceptable. Otherwise, the ticket is refused for the time being. In other words, if the window of time associated with the ticket is later than the window of time associated with the working group, then the ticket may be refused; otherwise, the ticket may be accepted.

Initially, the working group corresponds to the group of requests that is identified by the first ticket generated by the server. Accordingly, the server sets the working group to "1". Subsequently, the working group may be continuously updated to indicate the next group in a plurality of groups that are identified by the tickets that are generated by the server. In other words, the working group may be advanced or continuously incremented by "1".

The server may store data regarding the working group in a working group object. In some embodiments, the working group object is implemented as a group identifier and is stored in memory.

In some embodiments, the working group may be updated in real-time based on observed health metrics and thresholds, rules or other criteria defined in a policy. In particular, the server may update the working group based on at least one of an observed utilization rate for the resource or an observed throughput rate for servicing requests associated with the resource. These rates may be compared with threshold rates in order to determine whether the working group is be updated. If a threshold rate is not met, then the server may determine that there is excess capacity and, in response, may increment the working group so that the server may accept more tickets and thereby service more requests and/or may increase the target throughput rate. Conversely, if the threshold rate is met, then the server may determine that the load is excessive and, in response, may stop incrementing the working group or may decrement the working group so that the server may accept fewer tickets and/or may decrease the target throughput rate. Conveniently, in this way, the server provides a feedback loop mechanism wherein the observed health metrics may be used to continuously adjust the rate at which tickets are accepted.

In some embodiments, the server may include an application programming interface (API) or other suitable interface or component through which a consumer of the rate limiter may interact with or control the rate limiter and the threshold throughput rate. The consumer may be a resource and may be a stand-alone component or service, such as, for example, a component or service external to the server, or it may be an internal component of the server. The consumer may use the API to change the behaviour of the rate limiter. For example, if the consumer is overloaded, then consumer may use the API to provide an indication to the rate limiter to decrease the observed throughput rate. In some embodiments, the indication may cause the server to decrease the target throughput rate or to stop advancing the working group. Alternatively, if the consumer has excess capacity, and the consumer may provide an indication to increase the observed throughput rate. In some embodiments, the indication may cause the server to increase the target throughput rate or to advance the working group. In this way, the server may provide a feedback loop mechanism whereby a consumer provides feedback to the rate limiter based on the utilization of a resource.

In some embodiments, the working group may be updated based on an observed utilization rate of the rate limiter, the number of the requests that are associated with tickets that have been allowed and await, via the rate limiter, servicing (i.e. the number of requests that are currently held back from servicing by the rate limiter) (i.e. the number of requests that are allowed but are not yet being serviced), the rate at which tickets are accepted, a polling utilization rate (i.e. the percentage of requests that subsequently poll), the number of requests, the number of the target throughput rate of the rate limiter and/or the duration of a window associated with a group. For example, if a high percentage of user devices are robots that are not polling, the server may advance the working group to compensate. Notably, increasing the working group quickly may increase throughput but may sacrifice fairness, whereas increasing the target throughput rate may simply increase throughput without sacrificing fairness.

If the server does not reject or refuse the ticket in operations 704, 706, 708, 710 or 714, then the server may determine that the ticket should be accepted and the request should be serviced. If the server determines that the ticket should be accepted and the request should be serviced, then the server may proceed to accept the ticket and service the request.

In operation 716, the server may send a reply to the user device. If the server determines that the ticket is rejected, that the ticket is tampered with, that a one-time token is reused, or that the ticket is expired, then the server may transmit to the user device an error message. If the ticket is refused, then the server may transmit to the user device a reply indicating the refusal.

The server may continue to receive poll requests. The received poll requests, if accepted, may be serviced in an order that is different from the order in which the corresponding original requests were received.

Figure 8:
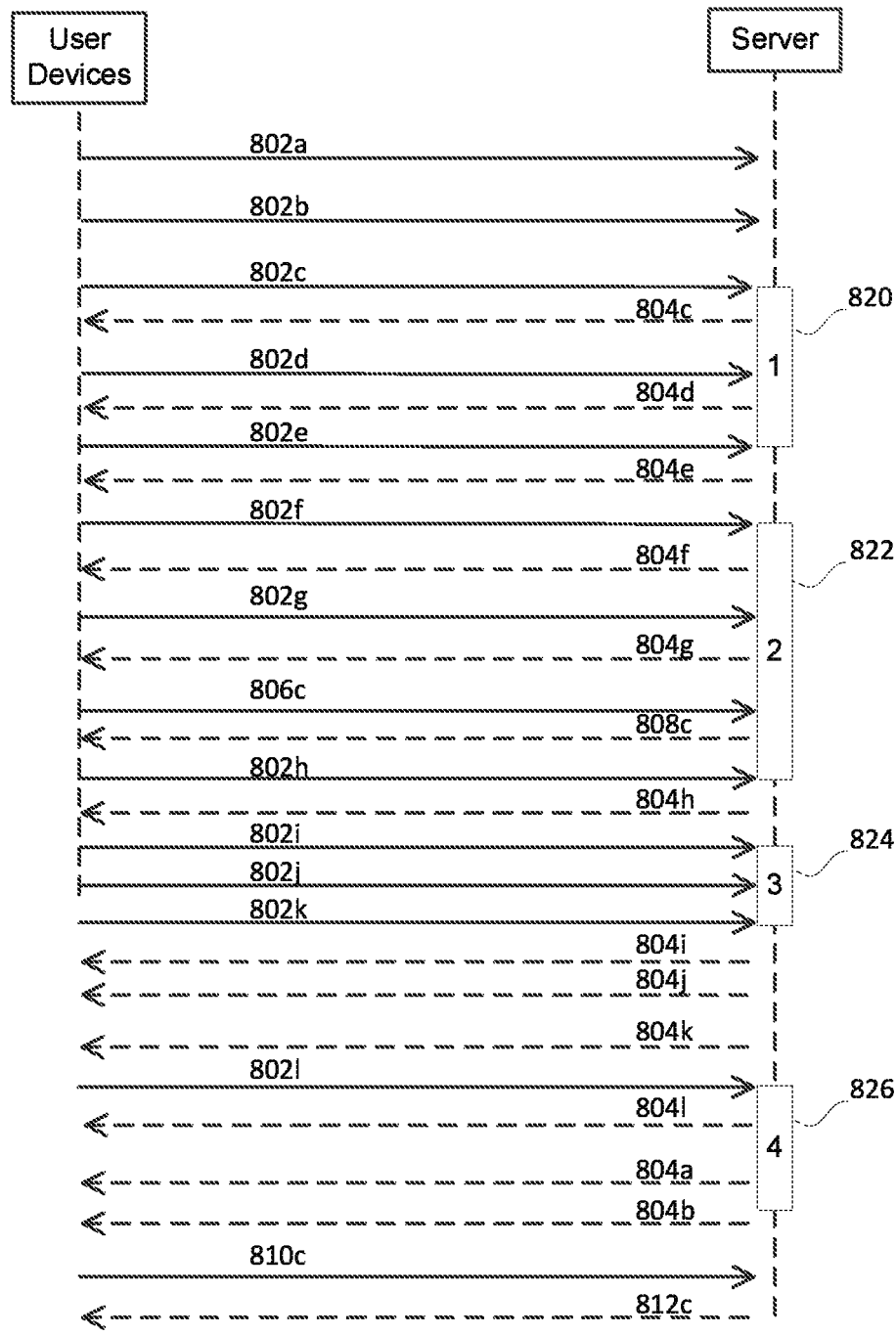
FIG. 8 shows, in sequence diagram form, an example of communications between a server and user devices, involving count based windows, according to one embodiment.

Reference is now made to FIG. 8, which shows, in sequence diagram form, an example of communications between a server and user devices, involving count based windows, according to one embodiment. In this example, the window length is defined as three original requests.

In some embodiments, the communications are processed and transmitted according to the methods 400, 500, 600 and 700 of FIGS. 4, 5, 6 and 7, respectively.

As illustrated, the communications involve original requests 802*a*-1, poll requests 806*c* and 810*c*, and corresponding respective replies 804*a*-1, 808*c* and 812*c*.

At the beginning of the sequence depicted in the sequence diagram 800, the server receives requests 802*a* and 802*b*. These requests may be serviced as described in relation to FIG. 4. At this point, in response to servicing these requests, the server enforces ticket control.

After enforcing ticketing, the server receives requests 802c-1. The request 802c may be received and processed as described in relation to FIG. 5 and requests 802d-1 may be received and processed as described in relation to FIG. 6.

In this example sequence, the server receives the request 802c, generates the ticket "1", sets the counter to "1", and transmits the reply 804c with the ticket "1".

The server receives the request 802d, determines that the counter value "1" is less than the maximum group size of three, increments the counter to "2", and transmits the reply 804d with the ticket "1". In this manner, the server determines that the same ticket should be used in replying to the request 802d as is used in the reply to the previous request 802c. In other words, the server determines that the same ticket should be associated with the request 802d and the previous request 802c.

The server then receives the request 802e and processes it in a manner similar to request 802d. At this stage, the counter value is "3" and the ticket sent in the reply 804e is once again "1".

The server then receives the request 802f, determines that the counter equals the maximum group size of three, generates a new ticket by incrementing the current ticket to the number "2", resets the counter to "1", and transmits the reply 804f with the ticket "2".

The server then receives and processes the requests 802g-1 and transmits the ticket "2" in replies 804g and 804h, the ticket "3" in replies 804i-k, and the ticket "4" in reply 804h.

In this manner, the requests 802c-1 are partitioned into four groups based on a group threshold size of three. The four groups identify requests received in successive windows of time 820, 822, 824 and 826. The server transmits the ticket "1" in response to the first three requests, the ticket "2" in response to the next three requests, and so on. Notably, although four requests are received during the second window of time, one of requests is a poll request 806c that does not count towards the group size.

In response to receiving the reply 804c with the ticket "1", the original request is automatically retransmitted to the server in the poll request 806c after a short wait. The poll request 806c may be processed as described in relation to FIG. 7. In this example, the server may determine that due to the load resulting from servicing the first two requests 802a and 802b, the received ticket is not acceptable at this time and so the server rejects the poll request 806c in reply 808c.

After receiving the reply 808c, the user device waits for a short duration and then transmits the poll request 810c with the ticket "1". Notably, while the user device was waiting, the server completes servicing the request 802a. This may reduce the load on the associated resource. Again, the poll request 810c may be processed as described in relation to FIG. 7. However, the server may set the working ticket to "1" based on the lighter load and accordingly accept the ticket and service the request.

Figure 9:
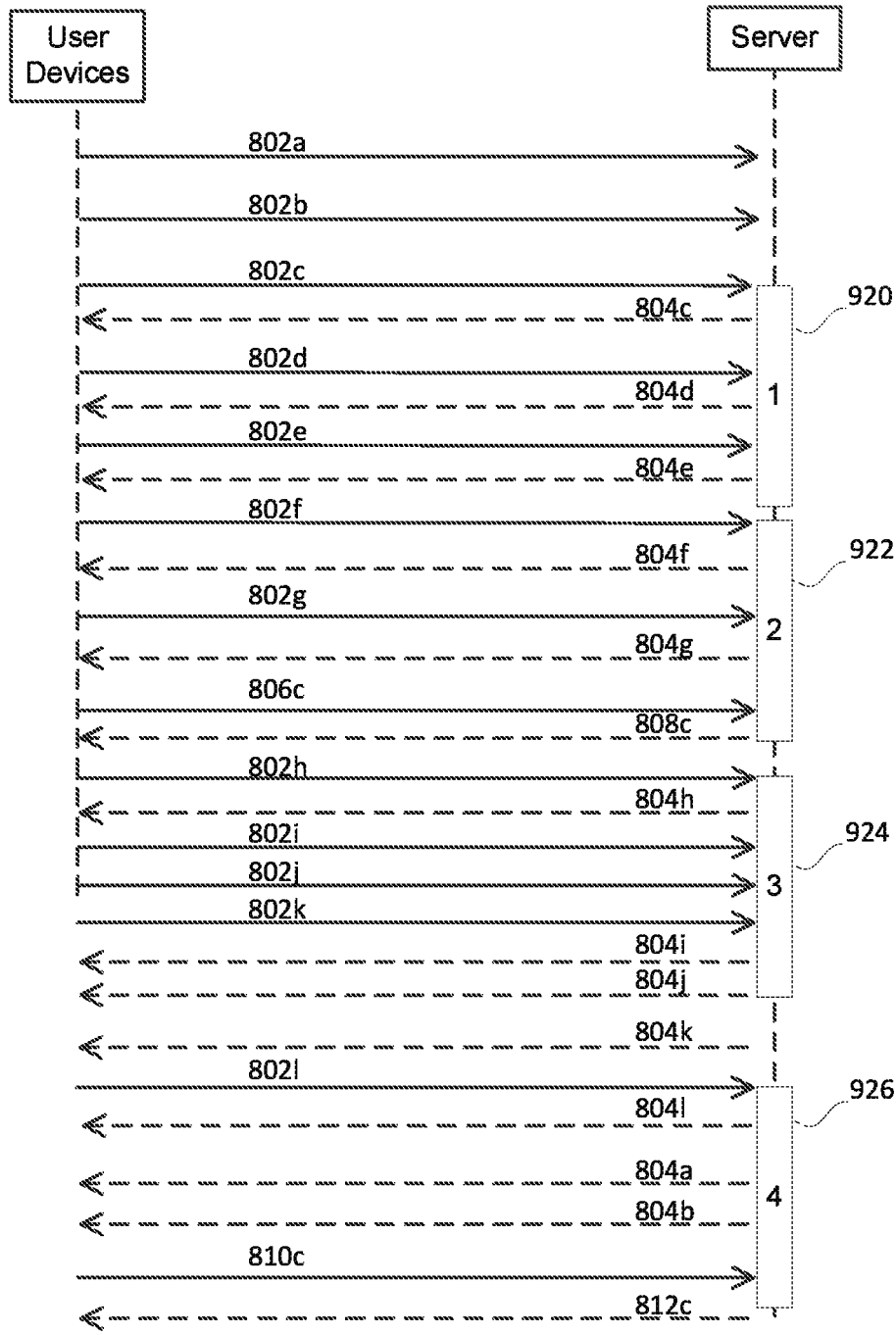
FIG. 9 shows, in sequence diagram form, an example of communications between a server and user devices, involving duration based windows, according to one embodiment.

Reference is now made to FIG. 9, which shows, in sequence diagram form, an example of communications between a server and user devices, involving duration based windows, according to one embodiment. The sequence diagram shows the same communications as those in FIG. 8; however, the windows of time 920, 922, 924 and 926 have a defined duration in contrast to the count based windows 820, 822, 824 and 826 of FIG. 8.

In this example sequence, the requests 802c-l are partitioned into four groups. The four groups identify requests received in successive windows of time 920, 922, 924 and 926. The first group identifies the requests 802c-e, the second group identifies the requests 802f and 802g, the third group identifies the requests 802h-k, and the fourth group identifies the request 802l. The server transmits the ticket "1" in response to the first three original requests 802c-e, the ticket "2" in response to the next two original requests 802f and 802g, the ticket "3" in response to the next four original requests 802h-k and the ticket "4" in response to the next original request 802l.

Figure 10:
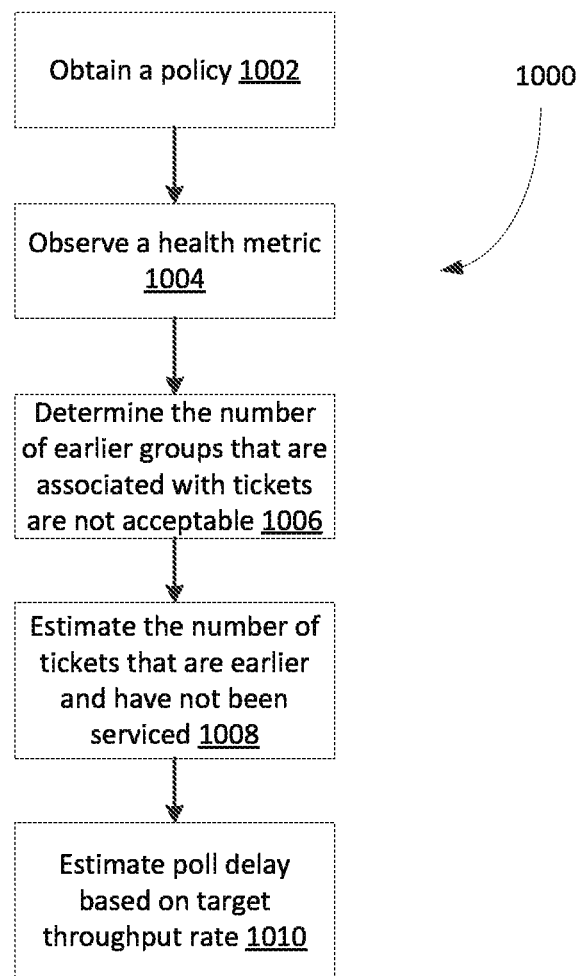
FIG. 10 shows, in flowchart form, an example method for determining a poll delay, according to one embodiment.

Reference will now be made to FIG. 10, which shows, in flowchart form, an example method 1000 for determining a poll delay, according to one embodiment. The poll delay is associated with a ticket and may be determined or updated whenever the server sends a reply that is associated with the ticket. For example, a poll delay may be transmitted to the user device when a reply that is sent to the user device indicating that the request or ticket is refused, for example as in operations 312 and 314 of FIG. 3. As noted above, the poll delay may indicate a period of the time that the user device is to wait before retrying the request and transmitting a poll request.

In operation 1002, the server obtains a policy. The policy may include a target throughput rate for servicing requests and the maximum number of requests that are in a group. The target throughput rate may correspond to the rate limit described in operation 314 of FIG. 3 and may be a maximum and a target that the server may aim to sustain.

In operation 1004, the server may observe a health metric associated with the server or resource. The server may dynamically update the target throughput rate based on the observed health metric.

In operation 1006, the server may determine the number of groups that are associated with tickets that are not acceptable and are earlier than the group associated with the ticket. In the case where the ticket is a simple integer, for example the number eight, and the working group is five, the number of groups that are earlier than the group associated with the ticket and are waiting to be serviced can be determined by calculating the difference less one, which is two (8−5−1=2).

In operation 1008, the server may estimate the number of tickets that have not been serviced and are earlier than the ticket associated with the poll delay. In making this estimate, it may be assumed that the tickets associated with the working group have not been serviced or a substantial number of those tickets have not been serviced. Accordingly, the tickets associated with the working group may be included in the estimate. The estimate may be obtained by adding one to the result of the operation 1006 and multiplying that number with the maximum number of requests in a group as defined in the policy. For example, if the result of the operation 1006 is two and the maximum number of request in a group is ten thousand, the estimate is (2+1)× 10,000 or thirty thousand.

In operation 1010, the server may estimate the period of time that needs to pass before the ticket can be serviced. The estimate may be calculated by dividing the result of the operation 1008 by the target throughput rate. For example, if the result of the operation 10004 is thirty thousand and the target throughput rate is two thousand requests per second, then the poll delay is fifteen seconds.

By way of another example, a maximum count for a group may be one hundred and a target throughput rate may be one hundred requests per second. If there is an initial burst of one thousand requests, then there are ten groups (i.e. 1000/100=10 groups). If a request belongs to the fifth group and the current working group is one, then based on the throughput rate the poll delay may be five seconds (i.e. 500 requests/100 requests/s=5 seconds).

In some embodiments, the poll delay may be determined using an algorithm that also takes into account the position of the ticket within the associated group. In this way, the poll delay may be different for each ticket associated with a group. Alternatively, if the position of the ticket within the associated group is not taken into account, then the poll delay may be the same for each ticket associated with a particular group. The position of a ticket within a group may be determined according to the arrival time of the request associated with the ticket relative to the arrival times of other requests associated with the group. In the aforementioned example, the poll delay for a ticket associated with the fifth group may be a value in the range of four to five seconds depending on the position of the ticket within the fifth group. Furthermore, there may be no minimum polling delay. Requests that are received in the earliest group may, in some cases, poll instantaneously or near-instantaneously and proceed to be serviced as quickly as the rate limiting phase throughput allows.

In this way, the poll delay may be long enough to allow the server to begin servicing poll requests associated with one group before beginning to service poll requests associated with the next group. In other words, the tickets associated with a particular group may have a duration of time (proportional to maximum group count/target throughput rate) to poll before the server receives poll requests that include the next ticket group. This duration of time may be referred to as a "poll duration".

By way of example, if the group size (i.e. the maximum count for a group) is 10,000 requests and there are 50,000 requests arranged in five groups and the target throughput rate is two thousand requests per second, then the maximum poll duration may be five seconds (i.e. 10,000 requests/2,000 requests/s=5 seconds).

In this way, the poll delay may be determined based on the policy and/or observed health metrics. The poll delay may also be based on at least one of the current working group, the size of the working group, the group assigned to or associated with the ticket, the maximum number of requests associated with a group, a target throughput for servicing requests, and the position of the group associated with the ticket relative to a working group.

It will be appreciated that FIFO servicing of requests may be the fairest approach to controlling access to resources, but in practice this approach is not always feasible because any disappearing, semi-inactive, or lagged users may block or negatively impact throughput. Notably, the proposed solutions disclosed in the present application may offer the benefit of "proportional" fairness. Whereas the "cost" of each task typically is "how large is the data packet", the cost in the proposed solution may be along the lines of "how quickly does a packet respond". The proposed solutions may balance the competing objectives of (i) maximizing throughput utilization and (ii) minimizing "unfair" non-FIFO servicing. The example methods may provide smooth utilization of approximately 100% when a high percentage of user devices poll in the designated poll window that is associated with the respective tickets. The example methods also provide for a level of fairness by grouping requests based on their arrival order and servicing requests based on the ordering of those groups.

In at least some embodiments, the utilization rate of the rate limiter may be expected to be approximately one hundred percent if a high percentage of user devices poll according to the poll delay specified by the server, that is, if a high percentage of poll requests occur immediately or nearly immediately after the respective associated poll delays. The utilization rate of the rate limiter reflects the rate at which the rate limiter is being utilized and may be a metric that is expressed percentage and may be determined by dividing an observed throughput rate of the rate limiter by a rate limit of the rate limiter.

In addition, the example methods facilitate the near-instantaneous expansion of the number of tickets that may be accepted when the polling utilization or observed utilization rate of the rate limiter is low. For example, if many online shoppers close their browser after receiving a message that they will need to wait in order to checkout, those user devices may not send a poll request. However, the server may determine in real-time that the polling utilization rate or the observed utilization rate of the rate limiter is below a threshold and instantaneously or nearly-instantaneously accept more tickets. More tickets may be accepted by way of advancing the working group and/or by increasing the drain rate (i.e. the target throughput rate) of the rate limiter.

In addition, in at least some embodiments, fairness may be obtained if a user device trusts the server-determined poll delay. For example, if the server indicates that the user device should wait thirty seconds before polling and the duration of the window associated with a particular group associated with the poll request is two seconds, the user device may trust that if the device waits thirty seconds before sending the poll request, the server may not accept tickets associated with the requests, including corresponding poll requests, that arrived in later groups as long as the user device sends the poll request at the end of the poll delay. In this example, a particular request could in a worst case scenario be "cheated" by a request that arrived later in the same group (i.e. at most the length of the window duration—2 seconds) as long as the requests poll according to the poll delay. A later request may be considered to "cheat" an earlier request if a poll request associated with the later request is accepted by the server before a poll request associated with the earlier request. In other words, the later request is able to be serviced ahead of the earlier request and out of order of the original arrival times. If a user device attempts to poll according to the poll delay, but is delayed by an additional amount of time that is less than the duration of the window, for example, due to network lag, then the request may be "cheated" by at most twice the duration of the window, since now the request may be "cheated" by requests associated with the next group. In the case where a poll request is made but delayed, and the associated ticket is not accepted, the server may indicate to the user device that it should retry the poll request immediately so that the original request will not be "cheated" worse than twice the window duration if they indeed poll sufficiently quickly. Put another way, in some implementations, if the poll delay is less than or equal to the window length (e.g. five seconds), then only tickets issued less than or equal to twice the window length (e.g. ten seconds) later than an earlier ticket may be accepted and proceed in advance of the earlier ticket, resulting in a maximum "unfairness" of ten seconds.

In this way, in at least some implementations, the working group may be updated so that user devices have a fair opportunity at having their requests serviced if they poll at or near the poll delay issued by the server and, accordingly, may expect that their requests will not be cheated by requests in later groups. Notably, polling near the poll delay can be important in some embodiments because if a user device is idle, for example, for 200 seconds, then it may be cheated by the amount of time it is idle, for example, up to 200 seconds.

Notably, the methods 300, 400, 500, 600, 700 and 1000 of FIGS. 3, 4, 5, 6, 7 and 10 may have a low fixed memory cost. The stored values may include the rate limit in operation 314 (FIG. 3), health metric in operation 406 (FIG. 4), policy in operation 408 (FIG. 4), current ticket in operation 504 (FIG. 5), the counter and timestamp in operation 506 (FIG. 5), working group in operation 714 (FIG. 7), and policy data in operation 1002 (FIG. 10). Data that is specific to a particular request, such as a shopping cart, may be stored client-side on the user device and included in a request, including poll requests, without being stored server-side in between requests and while the user device is waiting for the request to be serviced or is polling the server. In other words, data that is included in the original request may be stored on the user device and included in the poll requests without being stored on the server in between requests. Generally, any data that is associated with a particular request may be stored temporarily on the server in memory during the processing of the request, but not between requests. In this way, data that is included in a request may have an ephemeral lifespan on the server that begins when the request is received and ends when the request has been processed or a reply has been sent to the user device.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for controlling access to a computing resource, the method comprising:
    receiving, by a server at an application programming interface and via an electronic communication facility included in the server and from user devices, requests for triggering access, by the server, to a computing resource;
    transmitting, by the server via the electronic communication facility and to the user devices, tickets associated with the requests, each ticket associated with a respective one of a plurality of groups, the groups identifying requests received in successive windows of time, at least one of the plurality of groups identifying a plurality of requests;
    receiving, at the server via the electronic communication facility and from one of the user devices, a subsequent request, the subsequent request identifying one of the tickets previously transmitted to that user device;
    determining, using one or more processors included in the server, based on a comparison of a group associated with the identified one of the tickets and a working group, that the identified one of the tickets should be accepted and the subsequent request should be serviced, wherein the plurality of groups include the group associated with the identified one of the tickets and the working group, wherein the comparison of the group associated with the identified one of the tickets and the working group includes a comparison of the identified one of the tickets and a ticket, in the transmitted tickets, identifying the working group; and
    in response to determining that the identified one of the tickets should be accepted and the subsequent request should be serviced, servicing the request and accessing, by the server, the computing resource by interacting with a software module or software service.

2. The method of claim 1, wherein the determining that the identified one of the tickets should be accepted is based on at least one of an observed utilization rate for the computing resource or an observed throughput rate for servicing requests associated with the computing resource.

3. The method of claim 1, wherein sizes of the groups are based on a threshold number of requests.

4. The method of claim 1, wherein sizes of the groups are based on a threshold length of time between the arrival time of the earliest request and the latest request identified by the respective groups.

5. The method of claim 1, further comprising transmitting, to the one of the user devices, a response indicating that access to the computing resource is allowed.

6. The method of claim 1, wherein the requests are requests to access the computing resource.

7. The method of claim 1, further comprising:
    receiving, at the server from the one of the user devices, a second subsequent request, the second subsequent request identifying a second one of the tickets previously transmitted to that user device; and
    determining that the second one of the identified tickets should be rejected and the second subsequent request should not be serviced.

8. The method of claim 7, wherein the determining that the identified one of the tickets should be rejected comprises:
    determining that the second one of the identified tickets is expired.

9. The method of claim 7, wherein the determining that the identified one of the tickets should be rejected comprises:
    determining that the second one of the identified tickets is tampered with.

10. The method of claim 1, wherein the computing resource is a checkout function of an online store.

11. The method of claim 10, further comprising:
    receiving, at the server from a second one of the user devices, a second subsequent request, the second subsequent request identifying a second one of the tickets previously transmitted to the second one of the user devices;
    in response to receiving the second subsequent request, determining that at least a portion of the content of an online shopping cart associated with the second subsequent request is out-of-stock; and
    transmitting, by the server to the second one of the user devices, a response indicating an out-of-stock condition.

12. The method of claim 10, further comprising:
    receiving, at the server from a second one of the user devices, a second subsequent request, the second subsequent request identifying a second one of the tickets previously transmitted to the second one of the user devices;
    in response to receiving the second subsequent request, determining that an inventory level for a product variant is insufficient to fulfill a quantity of the product variant included in an online shopping cart associated with the second subsequent request; and
    transmitting, by the server to the second one of the user devices, a response indicating that the inventory level is insufficient to fulfill the order.

13. The method of claim 10, wherein the computing resource is a payment function, shipping rate function, tax rate function, credit card validation function, address validation function, postal or zip code validation function, order form validation function, order tracking function, order return function, currency conversion function, customer registration function, or a chat function connecting an online shopper with a customer service representative of the online store.

14. A system, the system comprising:
one or more processors;
an electronic communication facility; and
a memory storing computer-executable instructions that, when executed by the one or more processors, are to cause the one or more processors to:
receive, at an application programming interface and via the electronic communication facility and from user devices, requests for triggering access, by the system, to a computing resource;
transmit, via the electronic communication facility and to the user devices, tickets associated with the requests, each ticket associated with a respective one of a plurality of groups, the groups identifying requests received in successive windows of time, at least one of the plurality of groups identifying a plurality of requests;
receive, via the electronic communication facility and from one of the user devices, a subsequent request, the subsequent request identifying one of the tickets previously transmitted to that user device;
determine, using the one or more processors, based on a comparison of a group associated with the identified one of the tickets and a working group, that the identified one of the tickets should be accepted and the subsequent request should be serviced, wherein the plurality of groups include the group associated with the identified one of the tickets and the working group, wherein the comparison of the group associated with the identified one of the tickets and the working group includes a comparison of the identified one of the tickets and a ticket, in the transmitted tickets, identifying the working group; and
in response to determining that the identified one of the tickets should be accepted and the subsequent request should be serviced, service the request and access, by the system, the computing resource by interacting with a software module or software service.

15. The system of claim 14, wherein the determining that the identified one of the tickets should be accepted is based on at least one of an observed utilization rate for the computing resource or an observed throughput rate for servicing requests associated with the computing resource.

16. The system of claim 14, wherein sizes of the groups are based on a threshold number of requests.

17. The system of claim 14, wherein sizes of the groups are based on a threshold length of time between the arrival time of the earliest request and the latest request identified by the respective groups.

18. The system of claim 14, wherein the instructions, when executed by the processor, are to cause the processor to transmit, to the one of the user devices, a response indicating that access to the computing resource is allowed.

19. The system of claim 14, wherein the requests are requests to access the computing resource.

20. A non-transitory computer-readable medium storing processor-executable instructions that, when executed by one or more processors, are to cause the one or more processors to:
receive, at an application programming interface and via an electronic communication facility and from user devices, requests for triggering access, by the one or more processors, to a computing resource;
transmit, via the electronic communication facility and to the user devices, tickets associated with the requests, each ticket associated with a respective one of a plurality of groups, the groups identifying requests received in successive windows of time, at least one of the plurality of groups identifying a plurality of requests;
receive, via the electronic communication facility and from one of the user devices, a subsequent request, the subsequent request identifying one of the tickets previously transmitted to that user device;
determine, using the one or more processors, based on a comparison of a group associated with the identified one of the tickets and a working group, that the identified one of the tickets should be accepted and the subsequent request should be serviced, wherein the plurality of groups include the group associated with the identified one of the tickets and the working group, wherein the comparison of the group associated with the identified one of the tickets and the working group includes a comparison of the identified one of the tickets and a ticket, in the transmitted tickets, identifying the working group; and
in response to determining that the identified one of the tickets should be accepted and the subsequent request should be serviced, service the request and access, by the one or more processors, the computing resource by interacting with a software module or software service.

* * * * *